United States Patent
Lescorail et al.

(10) Patent No.: US 8,950,280 B2
(45) Date of Patent: Feb. 10, 2015

(54) WEAR-COMPENSATION DEVICE FOR A GEAR

(75) Inventors: Romuald Lescorail, St. Laurent en Gâtines (FR); Carole Girardin, Charentilly (FR); Daniel Jansen, Tours (FR)

(73) Assignee: Aktiebolaget SKF, Goteborg (SE)

( * ) Notice: Subject to any disclaimer, the term of this patent is extended or adjusted under 35 U.S.C. 154(b) by 397 days.

(21) Appl. No.: 13/415,099

(22) Filed: Mar. 8, 2012

(65) Prior Publication Data

US 2012/0227526 A1    Sep. 13, 2012

(30) Foreign Application Priority Data

Mar. 9, 2011    (FR) ...................................... 11 51933

(51) Int. Cl.
| | |
|---|---|
| *F16H 1/16* | (2006.01) |
| *F16H 35/00* | (2006.01) |
| *F16H 55/24* | (2006.01) |
| *F16H 57/022* | (2012.01) |
| *F16H 57/021* | (2012.01) |

(52) U.S. Cl.
CPC .............. *F16H 55/24* (2013.01); *F16H 57/022* (2013.01); *F16H 1/16* (2013.01); *F16H 2057/0224* (2013.01); *F16H 2057/0213* (2013.01)
USPC .......................... 74/388 PS; 74/425; 384/255

(58) Field of Classification Search
USPC ........................ 74/388 PS, 425, 398; 384/255
See application file for complete search history.

(56) References Cited

U.S. PATENT DOCUMENTS

| | | | |
|---|---|---|---|
| 6,269,709 B1 * | 8/2001 | Sangret ............................ | 74/398 |
| 6,763,738 B1 | 7/2004 | Tsutsui et al. | |
| 7,077,235 B2 * | 7/2006 | Eda et al. ........................ | 180/444 |
| 7,188,700 B2 * | 3/2007 | Eda et al. ........................ | 180/444 |
| 7,360,467 B2 * | 4/2008 | Segawa et al. .................. | 74/425 |
| 7,455,148 B2 * | 11/2008 | Segawa et al. ................. | 180/444 |
| 7,455,149 B2 * | 11/2008 | Segawa et al. ................. | 180/444 |
| 7,490,695 B2 * | 2/2009 | Segawa ........................... | 180/444 |
| 7,493,986 B2 * | 2/2009 | Kim et al. ....................... | 180/444 |
| 8,307,938 B2 * | 11/2012 | Tokura et al. .................. | 180/443 |
| 2003/0127277 A1 | 7/2003 | Murakami et al. | |

FOREIGN PATENT DOCUMENTS

| | | |
|---|---|---|
| DE | 10053183 A1 | 6/2001 |
| EP | 1818242 A2 | 8/2007 |
| WO | WO9911502 A1 | 3/1999 |

* cited by examiner

*Primary Examiner* — Drew Brown
(74) *Attorney, Agent, or Firm* — Bryan Peckjian; SKF USA Inc. Patent Dept.

(57) ABSTRACT

The wear-compensation device for a gear comprises a fixed support capable of being fixed axially on an external element in order to keep the device on the said external element, a bearing designed to be mounted on a shaft comprising one of the wheels of the gear, an eccentric mounted on the bearing and designed to be in contact with the external element, the said eccentric being able to move angularly relative to the fixed support. The device also comprises a torsion spring mounted axially between the fixed support and the eccentric and capable of exerting a circumferential preload force on the said eccentric, the said spring comprising a first end mounted inside a recess of the eccentric and a second end interacting with the fixed support.

18 Claims, 4 Drawing Sheets

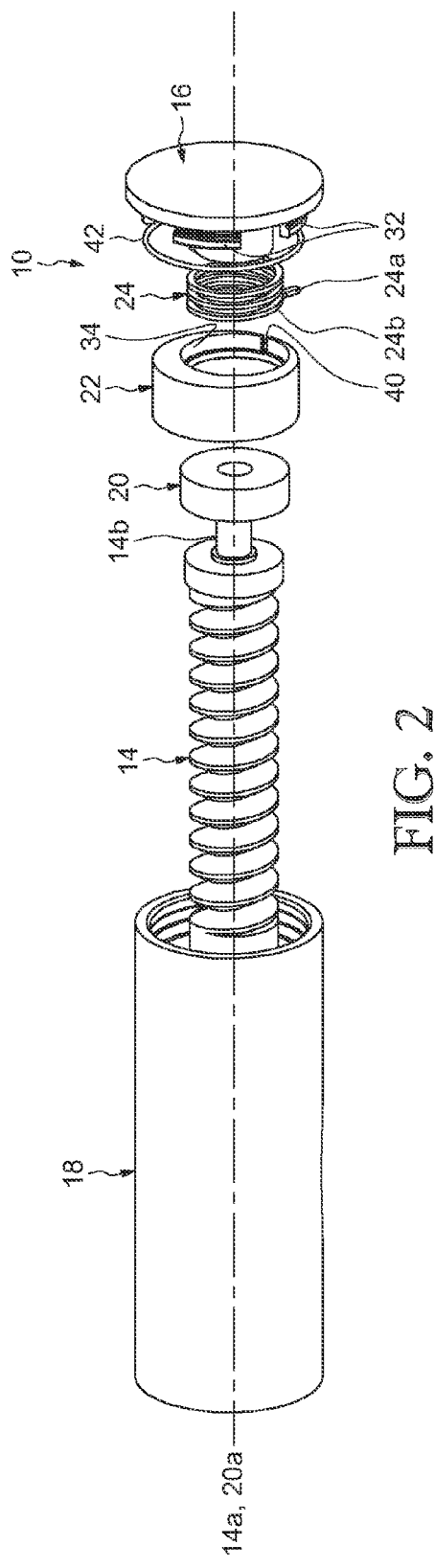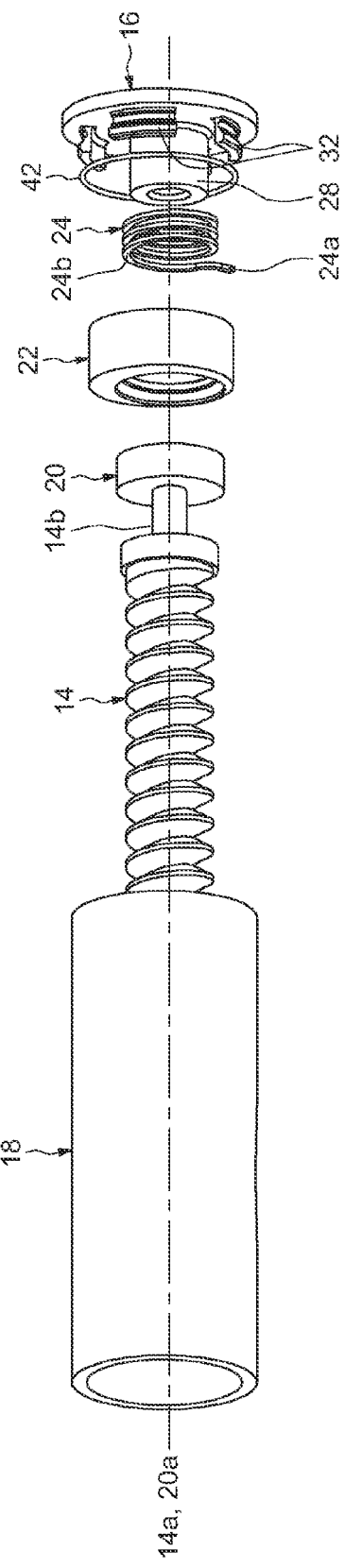

WEAR-COMPENSATION DEVICE FOR A GEAR

CROSS-REFERENCE TO RELATED APPLICATION

This U.S. Non-Provisional Utility application claims the benefit of co-pending French Patent Application Ser. No. 1151933, filed on Mar. 9, 2011, which is incorporated herein in its entirety.

FIELD OF THE INVENTION

The present invention relates to the field of wear-compensation devices for gear, notably used in assisted-steering mechanisms for motor vehicles.

BACKGROUND OF THE INVENTION

An assisted-steering mechanism usually comprises an electric assistance motor and a worm mounted on an output shaft of the said motor and meshing with a toothed wheel for example fixed to the shaft of the steering column or connected to the steering rack via an intermediate pinion.

U.S. Pat. No. 6,763,738 B1 discloses an assisted-steering mechanism for a motor vehicle comprising means for adjusting the distance separating the axes of the worm and of the associated toothed wheel so as to be able to adjust the clearance that exists between the teeth of the gear during assembly. This assisted-steering mechanism comprises no means to limit the phenomena of wear of the gear set over time.

SUMMARY OF THE INVENTION

The object of the present invention is to provide a mechanism to limit the phenomena of wear of the gear set over time.

In order to overcome this drawback, in the assisted-steering mechanism described in document WO 99/11502, one end of the worm connected to the electric assistance motor is mounted rotatably in an eccentric bore of a movable sleeve, the said sleeve being connected to a compression spring. When there is wear on the teeth of the worm and of the wheel supported by the steering column shaft, the compression spring causes the sleeve to rotate inside the associated housing. This gives an automatic compensation for the wear of the gear.

This solution leads to a considerable number of assembly operations.

More particularly, the object of the present invention is to provide a wear-compensation device for a gear easy to manufacture, to install, having a restricted space requirement and economic.

In one embodiment, the wear-compensation device for a gear comprises a fixed support capable of being fixed axially on an external element in order to keep the device on the said external element, a bearing designed to be mounted on a shaft comprising one of the wheels of the gear, and an eccentric mounted on the bearing and designed to be in contact with the external element, the said eccentric being able to move angularly relative to the fixed support. The device comprises a torsion spring mounted axially between the fixed support and the eccentric and capable of exerting a circumferential preload force on the said eccentric. The torsion spring comprises a first end mounted inside a recess of the eccentric and a second end interacting with the fixed support.

Advantageously, the fixed support comprises a centering portion for centering the torsion spring. Preferably, the torsion spring is coaxial with the bearing.

The second end of the torsion spring may abut against a bearing lug of the fixed support.

In one embodiment, the fixed support comprises a clip fastening member adapted to ensure the axial attachment of the device to the external element.

The fixed support may comprise a rotation blocking element capable of maintaining the predetermined angular position of the said support relative to the external element.

In one embodiment, the bearing comprises an inner ring designed to be mounted on the shaft supporting one of the wheels, an outer ring on which the eccentric is mounted, and at least one row of rolling elements placed between the said rings. Alternatively, the bearing may be a sliding bearing.

In one embodiment, the wheel is integrally formed on the shaft. The wheel may be integrally formed on the shaft so as to form a screw.

According to another aspect, the invention also relates to an assisted-steering mechanism for a motor vehicle comprising a wear-compensation device as defined above.

BRIEF DESCRIPTION OF THE DRAWINGS

The present invention will be better understood on studying the detailed description of embodiments taken as non-limiting examples and illustrated by the appended drawings in which:

FIG. 2 presents an exploded view in a first perspective of FIG. 1;

FIG. 3 presents an exploded view in a second perspective of FIG. 1;

DETAILED DESCRIPTION OF THE INVENTION

Figure 1:
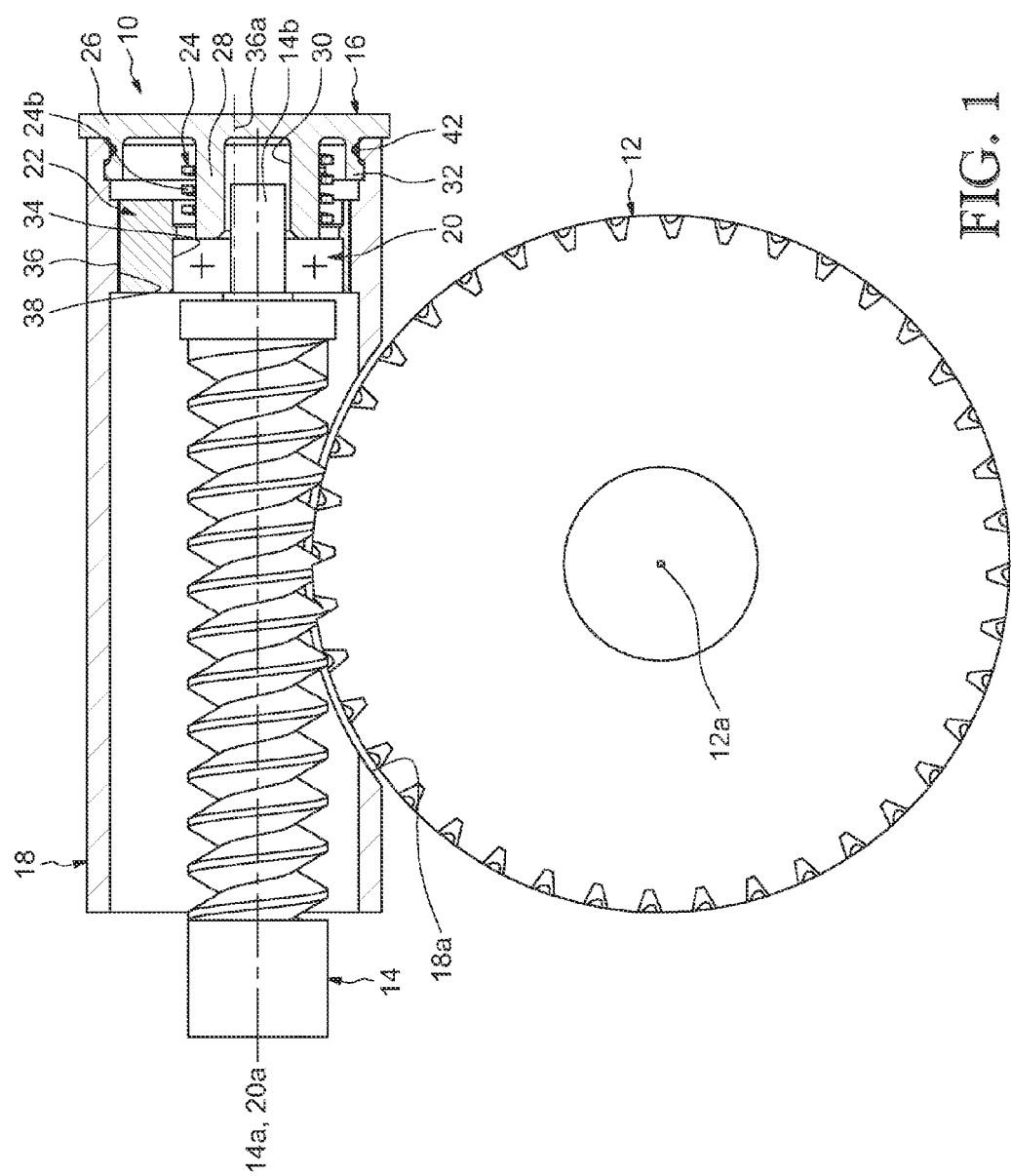
FIG. 1 is a view in axial section of a wear-compensation device according to a first exemplary embodiment of the invention.

In FIG. 1, a wear-compensation device, referenced 10 in its entirety, is associated with a gear of the type with a wheel 12 and with a worm 14. The gear illustrated is a crossed gear set and the axes 12a, 14a of the toothed gear and of the worm are orthogonal.

The device 10 comprises a fixed support 16 forming a cap designed to be mounted on a tubular housing 18 external to the said device, a rolling bearing 20 mounted on an end trunnion 14b of the worm, an eccentric 22 mounted on the rolling bearing, and a torsion spring 24 capable of applying a permanent circumferential force between the support 16 and the said eccentric. The worm 14 extends axially in the housing 18, the said housing comprising an opening 18a allowing the passage of the toothed wheel 12 so that the thread or threads of the worm mesh with the teeth of the wheel.

The bearing 20 (shown schematically) has a rotation axis 20a coaxial with the axis 14a of the worm. It comprises an inner ring mounted tightly on the trunnion 14b of the said worm and butting axially against a shoulder of the trunnion, an outer ring on which the eccentric 22 is mounted, a row of rolling elements, for example balls, and seals mounted radially between the said rings.

The fixed support 16 comprises a radial wall 26 closing off an axial end of the housing 18 and extended by an annular centering portion 28, coaxial with the axis 20a of the bearing and pressing axially against the inner ring of the said bearing. The centering portion 28 comprises a blind hole 30 inside which the trunnion 14b of the worm extends with a radial clearance. The support 16 also comprises a plurality of axial lugs 32 extending from the wall 26 axially on the side of the centering portion 28. The lugs 32 are spaced relative to one another in the circumferential direction. Each lug 32 comprises, at its free end, a hook extending radially outwards and designed to interact with a matching recess arranged in the bore of the housing 18. The lugs 32 form snap-fitting or clip fastening member for fitting the support 16 to the housing making it possible to obtain the axial attachment of these two elements. The support 16 may for example be made in a single piece by molding a synthetic material.

The eccentric 22 comprises a cylindrical bore 34 inside which is tightly mounted the outer ring of the bearing 20 and a cylindrical external surface 36, with an axis 36a which is radially offset relative to the axis 20a of the bearing. The bore 34 comprises a radial protuberance (not referenced) extending inwards and forming an axial stopping surface for the outer ring of the bearing 20. The external surface 36 of the eccentric presses radially against a matching cylindrical bearing surface 38 of the bore of the housing 18. The eccentric 22 can move angularly relative to the fixed support 16, to the housing 18 and to the worm 14.

The radial wall 26 of the support 16 and the eccentric 22 delimit an axial space in which the torsion spring 24 is placed. The spring 24, coaxial with the axis 20a of the bearing, is provided with a first end 24a (FIG. 2) housed inside a recess 40 arranged on the eccentric, with a second end butting in the circumferential direction against one of the lugs 32 of the fixed support, and with a working portion 24b connecting the said ends and winding radially around the centering portion 28 of the said support. In the embodiment illustrated, the turns of the spring 24 have, in cross section, a square profile. Alternatively, it is of course possible to provide turns having another profile, for example circular.

The device 10 also comprises an annular seal 42 mounted radially between the lugs 32 of the fixed support and the bore of the housing 18 so as to limit the intrusion of contaminating particles.

In order to mount the device 10 on the housing 18, the procedure is as follows. In a first step, the subassembly formed by the rolling bearing 20 and the eccentric 22 is mounted on the trunnion 14b of the worm, the external surface 36 of the said eccentric being in radial contact against the cylindrical bearing surface 38 of the housing 18. In a second step, the end 24a of the torsion spring is mounted in the recess 40 of the eccentric and the opposite end of the spring against the associated bearing lug 32 of the support 16. Then, the support 16 is made to pivot relative to the eccentric 22, to the worm 14 and to the housing 18 so as to prestress or preload the spring 24 between the support and the eccentric. Once the predetermined angular position of the support 16 relative to the housing 18 is reached, the support is prevented from rotating, for example by hammering or crimping, the axial retention of the said support on the housing being achieved by the lugs 32.

The spring 24 thus exerts a permanent circumferential force or torque on the eccentric 22 tending to permanently push the said eccentric, the bearing 20 and the worm 14 radially towards the wheel 12. This makes it possible to automatically compensate for the wear of the thread or threads of the worm 14 and/or of the teeth of the wheel 12 that may appear over time. The permanent circumferential force exerted by the spring 24 on the eccentric 22 makes it possible to obtain the angular movement of the said eccentric relative to the housing 18 and to the support 16, which causes a radial movement of the rolling bearing 20 and of the worm 14 towards the wheel 12.

Figure 4:
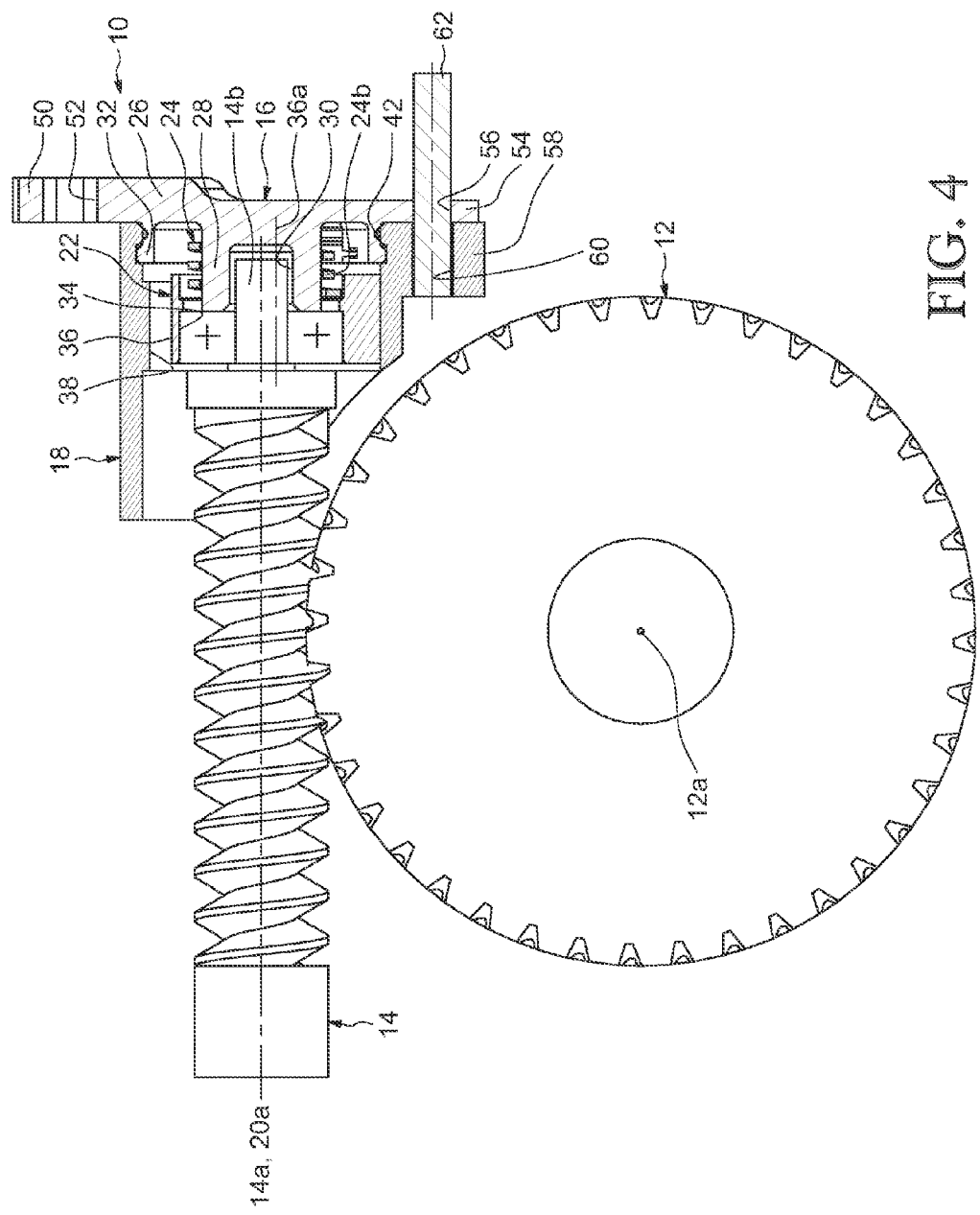
FIG. 4 is a view in axial section of a wear-compensation device according to a second exemplary embodiment of the invention.
Figure 5:
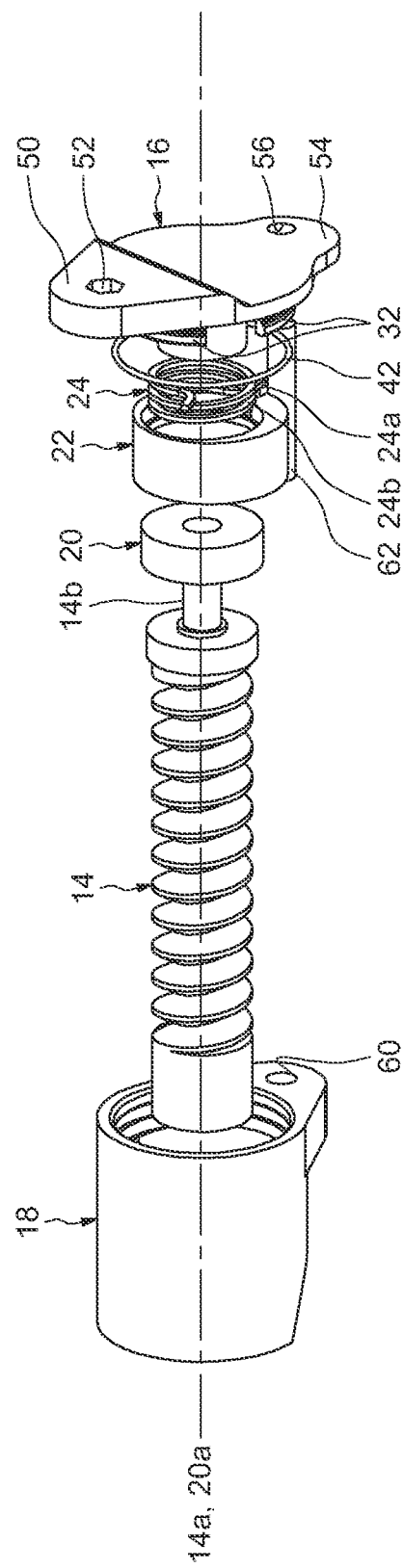
FIG. 5 is an exploded view in perspective of FIG. 4.

The embodiment illustrated in FIGS. 4 and 5, in which identical elements bear the same references, differs from the embodiment previously described in that the support 16 comprises a first radial protuberance 50 comprising a hollow cavity 52 provided for the housing, during assembly, of an operating key (not shown) in order to make it easier to pivot the support 16 for preloading the spring 24. The support 16 also comprises a second radial protuberance 54 opposite to the protuberance 50 and provided with a through recess 56. In this embodiment, the housing 18 comprises a radial ear 58 against which the protuberance 54 rests and provided with a recess 60. During assembly, when the recess 56 of the support is facing the recess 60 of the housing, the relative angular position of these two elements is immobilized by insertion of a rod 62 of the device into the said recesses.

In the embodiments illustrated, the wear-compensation device is used for a gear of the type with a wheel and with a worm that can be installed in an assisted-steering mechanism. The device may however be used for other types of crossed or non-crossed gear sets, for example a gear of toothed wheels, a gear of bevel pinions, a gear with a wheel and with a rack, and be used in other applications.

What we claim is:

1. A wear-compensation device for a gear, the wear-compensation device for a gear comprising:
    a fixed support capable of being fixed axially on an external element in order to keep the wear-compensation device for a gear on the external element;
    a bearing designed to be mounted on a shaft comprising a wheel of the gear;
    an eccentric mounted on the bearing and designed to be in contact with the external element, the eccentric being able to move angularly relative to the fixed support; and
    a torsion spring mounted axially between the fixed support and the eccentric and capable of exerting a circumferential preload force on the eccentric, the torsion spring comprising a first end mounted inside a recess of the eccentric and a second end cooperating with the fixed support,
    wherein the second end of the torsion spring abuts against a bearing lug of the fixed support.

2. A wear-compensation device for a gear according to claim 1, wherein the fixed support comprises a centering portion for centering the torsion spring.

3. A wear-compensation device for a gear according to claim 1, wherein the torsion spring is coaxial with the bearing.

4. A wear-compensation device for a gear according to claim 1, wherein the fixed support comprises a clip fastening member adapted to ensure the axial attachment of the wear-compensation device for a gear to the external element.

5. A wear-compensation device for a gear according to claim 1, wherein the fixed support comprises a rotation blocking element capable of maintaining a predetermined angular position of the support relative to the external element.

6. A wear-compensation device for a gear according to claim 1, wherein the bearing comprises an inner ring designed to be mounted on the shaft supporting the wheel, an outer ring on which the eccentric is mounted, and at least one row of rolling elements disposed between the inner ring and the outer ring.

7. A wear-compensation device for a gear according to claim 1, wherein the wheel is integrally formed on the shaft.

8. A wear-compensation device for a gear according to claim 7, wherein the wheel is integrally formed on the shaft so as to form a screw.

9. A wear-compensating assisted-steering mechanism for a motor vehicle comprising:
   a gear;
   a fixed support capable of being fixed axially on an external element in order to keep the wear-compensating assisted-steering mechanism for a motor vehicle on the external element;
   a bearing designed to be mounted on a shaft comprising a wheel of the gear;
   an eccentric mounted on the bearing and designed to be in contact with the external element, the eccentric being able to move angularly relative to the fixed support;
   a torsion spring mounted axially between the fixed support and the eccentric and capable of exerting a circumferential preload force on the eccentric, the torsion spring comprising a first end mounted inside a recess of the eccentric and a second end cooperating with the fixed support; and
   one of a steering column and a steering rack in operational communication with the gear,
   wherein the second end of the torsion spring abuts against a bearing lug of the fixed support.

10. A wear-compensating assisted-steering mechanism for a motor vehicle according to claim 9, wherein the fixed support comprises a centering portion for centering the torsion spring.

11. A wear-compensating assisted-steering mechanism for a motor vehicle according to claim 9, wherein the torsion spring is coaxial with the bearing.

12. A wear-compensating assisted-steering mechanism for a motor vehicle according to claim 9, wherein the fixed support comprises a clip fastening member adapted to ensure the axial attachment of the wear-compensating assisted-steering mechanism for a motor vehicle to the external element.

13. A wear-compensating assisted-steering mechanism for a motor vehicle according to claim 9, wherein the fixed support comprises a rotation blocking element capable of maintaining a predetermined angular position of the support relative to the external element.

14. A wear-compensating assisted-steering mechanism for a motor vehicle according to claim 9, wherein the bearing comprises an inner ring designed to be mounted on the shaft supporting the wheel, an outer ring on which the eccentric is mounted, and at least one row of rolling elements disposed between the inner ring and the outer ring.

15. A wear-compensating assisted-steering mechanism for a motor vehicle according to claim 9, wherein the wheel is integrally formed on the shaft.

16. A wear-compensating assisted-steering mechanism for a motor vehicle according to claim 15, wherein the wheel is integrally formed on the shaft so as to form a screw.

17. A wear-compensation device for a gear, the wear-compensation device for a gear comprising:
   a fixed support capable of being fixed axially on an external element in order to keep the wear-compensation device for a gear on the external element;
   a bearing designed to be mounted on a shaft comprising a wheel of the gear;
   an eccentric mounted on the bearing and designed to be in contact with the external element, the eccentric being able to move angularly relative to the fixed support; and
   a torsion spring mounted axially between the fixed support and the eccentric and capable of exerting a circumferential preload force on the eccentric, the torsion spring comprising a first end mounted inside a recess of the eccentric and a second end cooperating with the fixed support,
   wherein the torsion spring is coaxial with the bearing.

18. A wear-compensating assisted-steering mechanism for a motor vehicle comprising:
   a gear;
   a fixed support capable of being fixed axially on an external element in order to keep the wear-compensating assisted-steering mechanism for a motor vehicle on the external element;
   a bearing designed to be mounted on a shaft comprising a wheel of the gear;
   an eccentric mounted on the bearing and designed to be in contact with the external element, the eccentric being able to move angularly relative to the fixed support;
   a torsion spring mounted axially between the fixed support and the eccentric and capable of exerting a circumferential preload force on the eccentric, the torsion spring comprising a first end mounted inside a recess of the eccentric and a second end cooperating with the fixed support; and
   one of a steering column and a steering rack in operational communication with the gear, wherein the torsion spring is coaxial with the bearing.

* * * * *